United States Patent
Yang

(10) Patent No.: US 9,783,286 B1
(45) Date of Patent: Oct. 10, 2017

(54) METHOD AND AN APPARATUS FOR CONTROLLING A UAV, AND A UAV TAKE-OFF SYSTEM

(71) Applicant: ZEROTECH (Shenzhen) Intelligence Robot Co., Ltd., Shenzhen (CN)

(72) Inventor: Jianjun Yang, Beijing (CN)

(73) Assignee: ZEROTECH (SHENZHEN) INTELLIGENCE ROBOT CO., LTD., Longgang District, Shenzhen (CN)

( * ) Notice: Subject to any disclaimer, the term of this patent is extended or adjusted under 35 U.S.C. 154(b) by 0 days.

(21) Appl. No.: 15/183,806

(22) Filed: Jun. 16, 2016

(30) Foreign Application Priority Data

Apr. 11, 2016 (CN) .......................... 2016 1 0221661

(51) Int. Cl.
*B64C 13/20* (2006.01)
*B64C 13/00* (2006.01)
*G05D 1/06* (2006.01)

(52) U.S. Cl.
CPC .......... *B64C 13/20* (2013.01); *G05D 1/0661* (2013.01); *B64C 2201/024* (2013.01); *B64C 2201/08* (2013.01); *B64C 2201/086* (2013.01); *B64C 2201/108* (2013.01); *B64C 2201/14* (2013.01); *B64C 2201/141* (2013.01)

(58) Field of Classification Search
CPC .......... B64C 2201/00; B64C 2201/08; B64C 2201/086; B64C 2201/14
USPC ................. 244/12.2, 17.13, 17.23, 17.11
See application file for complete search history.

(56) References Cited

U.S. PATENT DOCUMENTS

| | | | |
|---|---|---|---|
| 5,719,732 A * | 2/1998 | Nagahama | H02H 7/0855 318/434 |
| 7,195,200 B2 * | 3/2007 | Yamane | B64C 13/20 244/17.13 |
| 8,798,814 B1 * | 8/2014 | Spencer, V | B64D 43/00 244/10 |
| 9,126,693 B1 * | 9/2015 | Shi | B64D 31/06 |
| 2007/0035897 A1 * | 2/2007 | Simon | H02H 7/0816 361/29 |
| 2016/0016664 A1 * | 1/2016 | Basuni | B64C 39/024 244/17.13 |
| 2016/0101856 A1 * | 4/2016 | Kohstall | G05D 1/101 244/17.13 |

* cited by examiner

*Primary Examiner* — Marc Burgess
(74) *Attorney, Agent, or Firm* — Jun He Law Offices P.C.; James J. Zhu

(57) ABSTRACT

A method for controlling an unmanned aerial vehicle (UAV) is provided. The UAV comprises at least one rotor. The method includes receiving a take-off signal; initiating the at least one rotor to operate with a first preset rotation acceleration in response to the take-off signal; detecting a take-off status information of the UAV, the take-off status information at least comprising a current height of the UAV; determining whether the detected current height of the UAV is equal to or greater than a threshold; and sending a hover signal to the at least one rotor to enable the UAV to hover in the current height in response to the determination that the detected current height of the UAV is equal to or greater than the threshold.

14 Claims, 8 Drawing Sheets

METHOD AND AN APPARATUS FOR CONTROLLING A UAV, AND A UAV TAKE-OFF SYSTEM

CROSS-REFERENCE TO RELATED APPLICATIONS

This application claims priority to Chinese patent application no. 201610221661.6, the disclosure of which is incorporated herein by reference.

TECHNICAL FIELD

The present disclosure generally relates to a technique for controlling unmanned aerial vehicles (UAVs).

BACKGROUND

With the continuous development of aviation technology, aerial apparatuses have been widely used in military and civilian fields, aerial apparatus refers to an aircraft or UAVs and other aerial devices with flight capabilities and so on. Aerial apparatus has been widely used in geological disaster monitoring, forest fire prevention, aerial mapping, environmental monitoring and detection of target and other fields.

A variety of techniques have been developed in connection with the operation of the UAVs, including take-off, in-flight, and landing. For example, take-off is one of common used operations of the UAVs. In the art known to the present inventors, UAVs take-off techniques can be categorized into two approaches.

One approach is to launch the UAVs from the ground. For example, prior to take-off, a typical rotary wing UAV is placed on the ground by a professional user. Then, the professional user controls take-off of the rotary wing UAV by manipulating a remote control device associated with the rotary wing UAV. During take-off, in order to make the UAVs' take-off safe and normal, the professional user is required to control the UAVs' attitude balance and propulsion power output.

An alternative approach is to launch the UAVs via hand tossing. That is, UAVs are thrown into the air and then the UAVs in the air intelligently identifies take-off opportunity and starts flying in the air into the normal state. Compared with the first approach, hand launching lowers the requirement of the user's operating capability.

SUMMARY

An example method for controlling an unmanned aerial vehicle (UAV) is provided. The UAV comprises at least one rotor, and the method comprises receiving a take-off signal; initiating the at least one rotor to operate with a first preset rotation acceleration in response to the take-off signal; detecting a take-off status information of the UAV, the take-off status information at least comprising a current height of the UAV; determining whether the detected current height of the UAV is equal to or greater than a threshold; and sending a hover signal to the at least one rotor to enable the UAV to hover in the current height in response to the determination that the detected current height of the UAV is equal to or greater than the threshold.

An example apparatus for controlling an UAV is provided. The UAV comprises at least one rotor, and the apparatus comprises a receiver configured to receive a take-off signal; an initiator configured to initiate at least one rotor of the rotor assembly to operate with a first preset rotation acceleration in response to the take-off signal; a detector configured to detect a take-off status information of the UAV, the take-off status information at least comprising a current height of the UAV; a determining module configured to determine whether the detected current height of the UAV is equal to or greater than the threshold; and a controller configured to send a hover signal to the at least one rotor to enable the UAV to hover in the current height in response to the detected current height of the UAV being greater than or equal to a preset hover height.

An example take-off system is provided. The system comprises a UAV having at least one rotor and a take-off platform configured to permit the UAV to take off. The UAV is configured to detect a current height and adjust a rotation speed of the at least one rotor, such that the UAV is enabled to hover in the current height upon the detected current height of the UAV being greater than or equal to a threshold.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE FIGURES

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure.

Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1A:
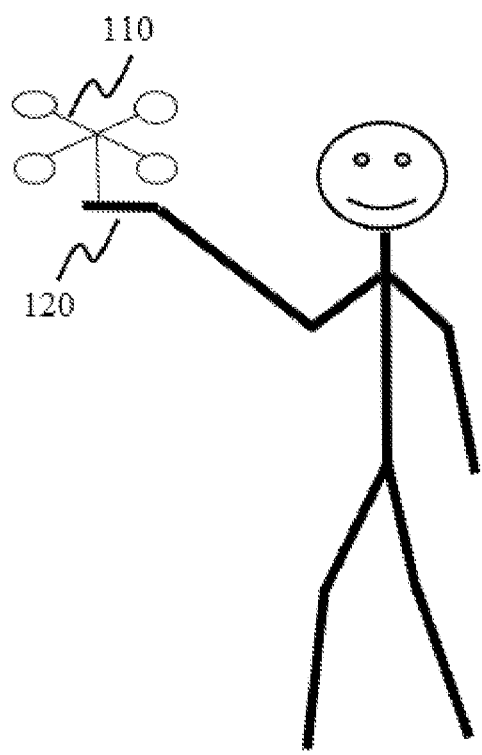
FIGS. 1A-1B are diagrams of an exemplary UAV take-off system environment within which embodiments of the disclosure may be practiced.
Figure 1B:
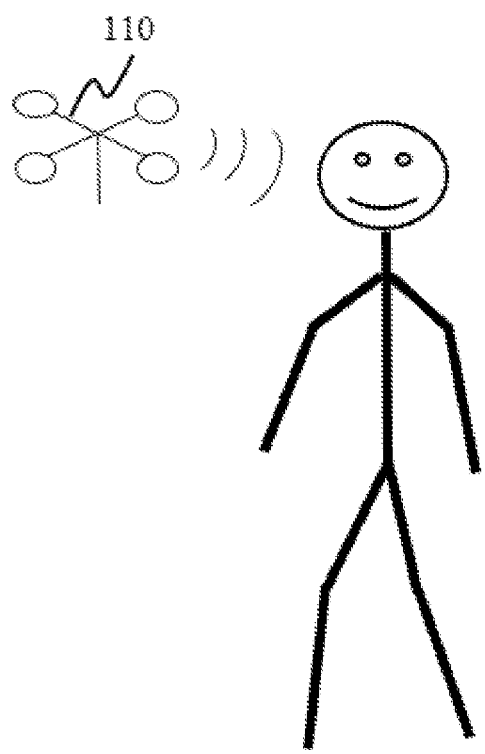

FIGS. 1A-1B illustrate an exemplary UAV take-off system environment 100 within which embodiments of the present disclosure may be practiced.

In FIG. 1A, an UAV 110 and a take-off platform 120 are provided in the UAV take-off system environment 100. The UAV 110 represents an aircraft without a human pilot aboard. The flight of UAV 110 may be controlled with various kinds of autonomy. It may be operated either by a given degree of remote control from a user, located on the ground or in another vehicle, or fully autonomously, by onboard computers. Further, in order to fully operate and extend its capability, the UAV 110 may be programmed with various computer software and carry payloads such as cameras, power supply, sensors, actuators. For example, the UAV 110 can be configured with an image capturing component, such as a camera, to capture an image during a flight in civilian or military use. In the example of capturing the image in civilian use, the UAV can be configured to flight in a particular height to capture an image of the user.

Further, UAVs can be categorized into a rotary-wing UAV and a fixed-wing UAV. Typically, the rotary-wing UAV does not require runways to take off or land from and possesses the capacity to hover over areas while performing agile maneuvering. In the example of FIG. 1A, the UAV 110 is equipped with a plurality of rotors, for example, four rotors. However, persons of ordinary skill in the art will recognize that the UAV 110 may carry on any number of rotors as required without departing from the spirit or scope of the present disclosure. That is, the UAV 110 drives its body through adjusting the propulsion output of the rotors, thereby moving the UAV 110 as required in a desired direction and at a desired speed.

The take-off platform 120 refers to a tool that supports the UAV 110 before take-off. As depicted in FIG. 1A, the take-off platform 120 refers to the user's hand. More specifically, the UAV 110 may be put on a palm of the user's hand and prepared to launch from the palm. However, the UAV 110 may be assisted and supported by other tools, such as a mobile platform with a certain height.

As shown in FIG. 1A, the UAV 110 is placed by a user on the take-off platform 120 with a certain height and prepared to launch from the user's hand 120 according to the user's instructions. The certain height could be any height intended by a user, for example, a height for video or image capturing. In the example of FIG. 1, the take-off platform 120 has a height substantially same as or a bit higher than the user's head. However, persons of ordinary skill in the art will recognize that the UAV 110 may be placed at other positions without departing from the spirit or scope of the present disclosure. The user could input an instruction to the UAV 110 at the position shown in FIG. 1A. Once the instruction is input by the user, the UAV 110 could initiate its propulsion units to start outputting a relative low power. For example, the UAV 110 could initiate the at least one rotor to operate with a first preset rotation acceleration in response to the instruction.

Once the UAV 110 is initiated, the UAV 110 may detect a variety of parameters and compares the detected parameters with a predetermined threshold. Based on the comparison results, the UAV 110 will adjust the output of the propulsion units to perform subsequent actions. For example, once the at least rotor is initiated to operate with the first preset rotation acceleration, the user may apply certain actions to the UAV 110, including but not limited to, withdrawing the user's hand from holding/supporting the UAV 110, or moving the UAV 110 upward. Once receiving external actions imposed from the user, the position and/or movement of the UAV 110 will change and the UAV 110 will start to detect the variety of parameters. One of the parameters could be a current height of the UAV 110 detected by a sensor of the UAV 110. Based on the comparison between the detected current height and the threshold, the UAV 110 will adjust the output of propulsion power to achieve intended operations, for example, hover at a certain height.

An example of the current height is a relative height from the UAV 110 to the take-off platform 120 and the threshold is a minimum height unit that is detectable by the sensor of the UAV 110. Specifically, once the UAV 110 is initiated, the UAV 110 may be lifted upward by the user and obtains an initial ascending acceleration. Then the initial ascending acceleration is compared with an ascending acceleration threshold. Based on the compare, the UAV 110 is configured to adjust its propulsion output and detect the current height from the UAV 110 to the user's hand. For example, if the initial ascending acceleration is greater than the ascending acceleration threshold, the UAV 110 will increase the propulsion output. Thus, with the increased propulsion output, the UAV will overcome the gravity and gradually depart from the take-off platform 120. In such case, the UAV departs from the take-off platform 120 more quickly than the UAV without being lifted upward by the user. Once the detected current height reaches the minimum height unit that is detectable by the sensor of the UAV 110, the UAV 110 would send a hover signal to the at least one rotor to enable the UAV 110 to hover in the current height.

Another example of the current height is a vertical height from the UAV vertically downward to a closest solid surface and the vertical height is a relative height from the UAV to the closest solid surface which is immediately detected upon removal of the take-off platform. Specifically, once the UAV 110 is initiated, the user may withdraw his hand at a particular moment to remove the UAV 110's support. Upon the removal of the support from the user's hand, the UAV 110 may start descending. The UAV 110 starts to detect the current height from the UAV 110 to a closest solid surface. The current height is detectable if the current height from the UAV 110 to a closest solid surface is greater than the minimum height unit of the UAV's sensor, and, accordingly, the UAV 110 records a current height of the UAV immediately detected upon removal of the take-off platform. In response to the descending, the UAV 110 may adjust the propulsion output until the following detected current height reaches the current height which is immediately detected upon removal of the take-off platform.

Referring to FIG. 1B, once the detected current height reaches the threshold, the UAV 110 is flying at a position with substantially same height as that of the position in FIG. 1A. That is, when the UAV 110 adjust the propulsion output of the rotors to achieve intended operations, including but not limited to, hovering at a particular height.

Once the UAV 110 is hovering, it means that the UAV 110 has entered a normal flight state. Then, the UAV 110 could fly to any positions, for example, the same position as in FIG. 1B, to perform any operations as intended by the user. For example, the UAV 110 can be equipped with a camera to capture an image. Specifically, during the capturing, since a capturing position and a capturing angle are the key factor to get a good image, the UAV 110 can hover at an intended position and perform steady flight from the intended position, thus obtaining the capturing position and shooting angle as required by the user. Then, in accordance with the capturing angle, the user can do a variety of activities including posing to get an ideal image. Further specifics of the UAV 110 self-adjustments will be detailed in embodiments as illustrated in FIGS. 2-6.

Figure 2:
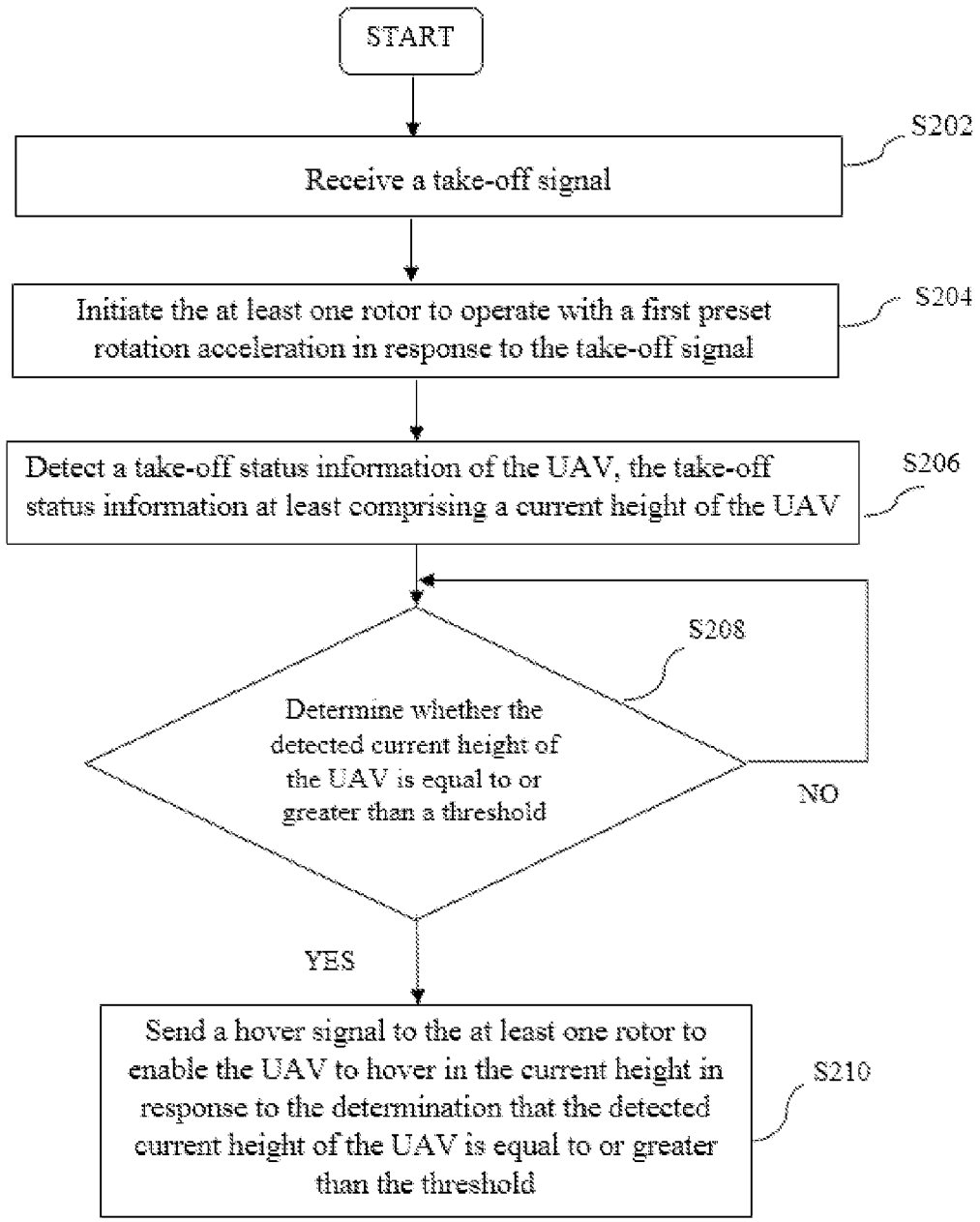
FIG. 2 is a flowchart of an exemplary method for controlling the UAV, according to embodiments of the disclosure.

FIG. 2 is a flowchart of an exemplary method for controlling the UAV, according to embodiments of the disclosure. The exemplary method may be implemented by a control apparatus of UAV. The control apparatus can be implemented by hardware and/or software, and integrated in an internal data processing chip of the UAV, for example, the UAV's flight control chip. Alternatively, the control apparatus can be integrated in a data processing chip of a cloud, and the data processing chip of the cloud can communicate with the UAV by wireless communication. The exemplary method will be detailed as follows.

In Step S202, a take-off signal is received by the UAV 110. The take-off signal is triggered by inputting an instruction by a user. For example, the UAV 110 can be placed in a take-off platform 120 with a certain height, for example, in the user's hand as depicted in FIG. 1A. Other positions are also possible. Then, the user input the instruction to the UAV110.

The take-off platform 120 refers to any platform on which the UAV 110 is positioned before take-off. The take-off platform includes, but not limited to, a user's hand, ground, a device with a certain height or sea level. Further, the take-off platform 120 could merely support the UAV110 without lifting upward the UAV110. Alternatively, the take-off platform 120 could lift upward the UAV110.

The take-off signal refers to a signal that triggers a UAV control method. For example, after receiving the take-off signal, the data processing chip of the UAV or the data processing chip of the cloud will execute the corresponding UAV control method. The take-off signal is converted from a user's instruction. The instruction refers to an instruction from the user that instructs the UAV 110 to perform corresponding actions. The instruction may be input by a variety of manners, for example, by tapping the body of the UAV in a specified number of times, pressing a take-off button of the UAV, inputting voice "take-off," etc.

In step S204, at least one rotor is initiated to operate with a first preset rotation acceleration in response to the take-off signal. That is, upon receiving the take-off signal, the data processing chip will send a signal to initiate a rotor assembly which comprises at least one rotor. Then, the rotor assembly will operate with a first preset rotation acceleration, for example, 600 r/s.

In step S206, a take-off status information of the UAV is detected, and the take-off status information comprises a current height of the UAV. The current height of the UAV can be directly obtained by a sensor, for example, an ultrasonic sensor or an infrared sensor, etc. Alternatively, the current height of the UAV may be indirectly obtained through a baroceptor (i.e., the current height can be calculated based on a barometric pressure of the current position).

In some embodiments, the current height of the UAV could be a relative height from the UAV to the take-off platform. For example, once the at least one rotor is initiated to operate with a first preset rotation acceleration, the user does not withdraw his hand and the UAV does not fly outside of the user's hand. In this case, the detected current height would be a relative height from the UAV to the user's hand.

In alternative embodiments, the current height of the UAV could be a vertical height from the UAV vertically downward to a closest solid surface. For example, once the at least one rotor is initiated to operate with a first preset rotation acceleration, the user withdraws his hand and the UAV flies outside of the user's hand. In this case, the detected current height could be the vertical height from the UAV vertically downward to the closest solid surface, for example, the ground where the user stands.

In step S208, whether the detected current height of the UAV is equal to or greater than a threshold is determined.

In step S210, if it is determined that the detected current height of the UAV is equal to or greater than the threshold, a hover signal is send to the at least one rotor to enable the UAV to hover, e.g., in the current height.

In some embodiments, the threshold is a minimum height unit that is detectable by a sensor of the UAV. For example, when the user places the UAV on the platform, the height of the take-off platform may be an UAV hover height intended by the user. Given that the UAV is placed on the take-off platform and initiated to operate with the first preset rotation acceleration, the UAV may not be able to detect any height due to insufficient propulsion output to enable the UAV to depart from the take-off platform. Thus, the threshold may be set as being equal to or greater than the minimum height unit of the UAV's sensor. Here, the minimum height unit of the sensor, also referred as blind spot size, is directed to a detectable minimum height of the sensor. In the example of the ultrasonic sensor or the infrared sensor, the minimum height unit is relatively small, for example, 20-30 cm. In other words, when the user places the UAV in the take-off platform with certain height and input the instruction to the UAV, once the sensor of the UAV is able to detect height information, the UAV will hover on the current height, which is substantially same as the height of the take-off platform intended by the user.

In alternative embodiments, the current height of the UAV is a vertical height from the UAV vertically downward to a closest solid surface, and the vertical height is a relative height from the UAV to the closest solid surface which is immediately detected upon removal of the take-off platform. For example, when the user places the UAV on the take-off platform and sends the instruction to the UAV, the UAV will operate with the first preset rotation acceleration. Then, the user may withdraws his hand at a particular moment. Upon removal of the user's hand, the UAV may starts descending and thus is able to detect a current height of the UAV. The current height of the UAV is a vertical height from the UAV vertically downward to a closest solid surface upon the UAV's removal of the user's hand. Then the UAV records the current height which is immediately detected upon the UAV's removal of the user's hand. Since the UAV may keep descending, the UAV will adjust its propulsion output and keep detecting the current height of the UAV. For example, the UAV will detect a vertical velocity of the UAV to identify a timing for adjusting propulsion output. If the detected vertical velocity of the UAV reaches a descending velocity threshold, the UAV will increase the propulsion output. Thus, with the increased propulsion output, the UAV may stop descending and begin to ascend. Once the following detected current height of the UAV is greater than or equal to the current height which is immediately detected upon the UAV's removal of the user's hand, the UAV will send a hover signal to the at least one rotor to enable the UAV to hover in the current height.

The take-off status information may include other information, including but not limited to, a current velocity of the UAV, an ascending acceleration of the UAV, and a current rotation speed of the at least one rotor. Through these information, the take-off status may be further optimized, as will be detailed in the following examples.

Figure 3:
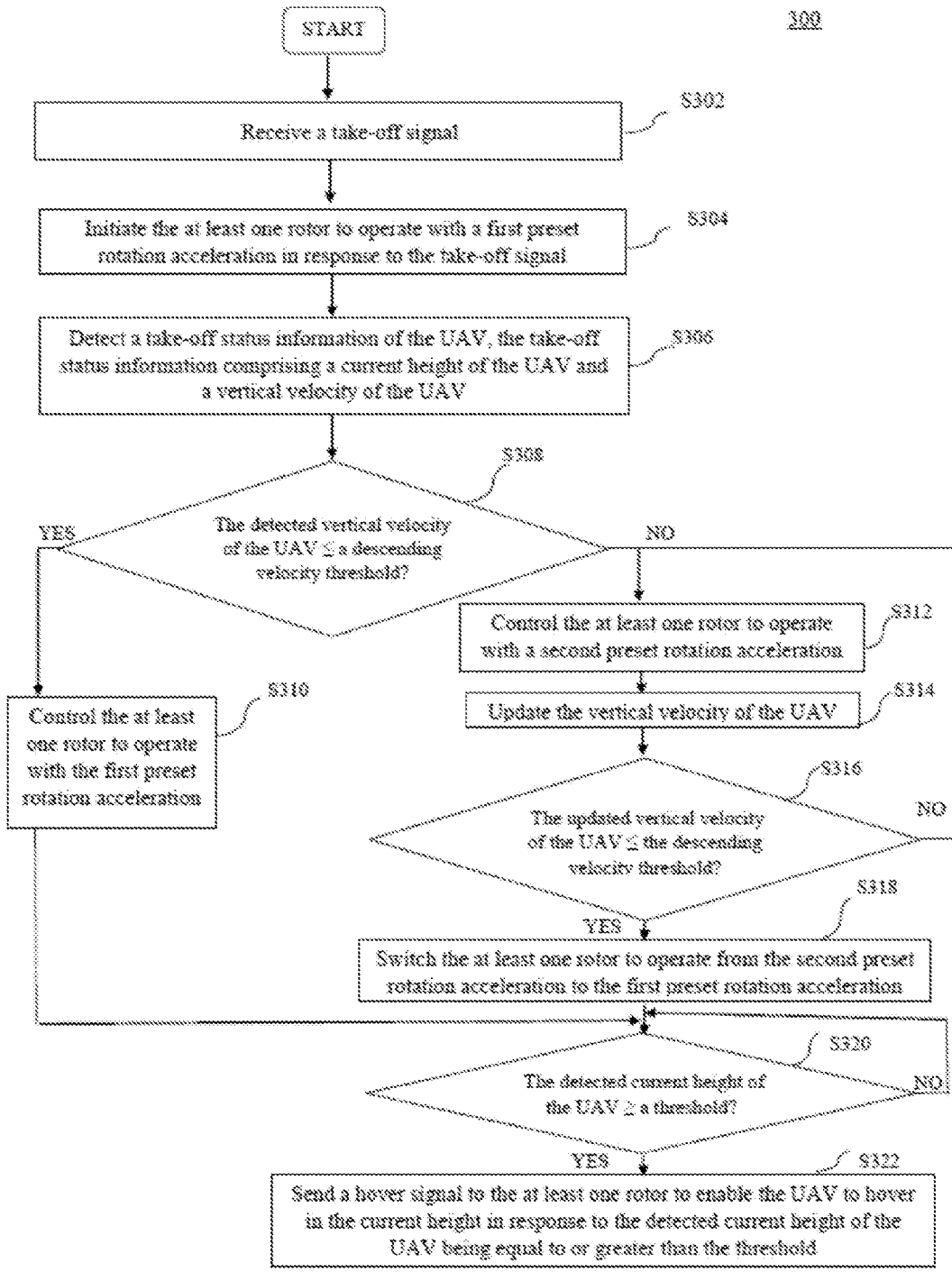
FIG. 3 is a flowchart of another exemplary method for controlling the UAV, according to embodiments of the disclosure.

FIG. 3 is a flowchart of another exemplary method for controlling the UAV, according to embodiments of the disclosure. Steps S302-304 are substantially same as with the steps S202-204, which will not be elaborated here.

In step S306, in addition to detecting the current height of the UAV, the take-off status information may further include a vertical velocity of the UAV. The vertical velocity of the UAV can be detected by a velocity sensor of the UAV. Depending on the detected vertical velocity of the UAV, the rotation speed of the at least one rotor will be adjusted accordingly. Here, the detected vertical velocity of the UAV is served as an indicator of whether the UAV is in a normal take-off state or not. If the detected vertical velocity of the UAV indicates that the UAV's take-off is normal, the at least one rotor is controlled to maintain the preliminary speed, for example, the first preset rotation acceleration. If the detected vertical velocity of the UAV indicates that the UAV's take-off is abnormal, the UAV will adjust its propulsion output. For example, when the take-off platform supporting the UAV is removed, the lifting force produced from the UAV cannot overcome the gravity of the UAV, and, accordingly, the UAV starts descending. An example of adjustment may be controlling the at least one rotor to increase the preliminary speed up to a greater speed, for example, a second preset rotation acceleration.

In step S308, before the detected current height of the UAV becomes equal to or greater than the threshold, whether the detected vertical velocity of the UAV is less than or equal to a descending velocity threshold is determined. The descending velocity threshold can be set in accordance with actual conditions, for example, 20 cm/s.

If it is determined that the detected vertical velocity of the UAV is less than or equal to the descending velocity threshold, then the method proceeds to steps S310, S320, and S322. That is, through steps S310, S320, and S322, the at least one rotor is controlled to operate with the first preset rotation acceleration, until the detected current height of the UAV is greater than or equal to the threshold.

If it is determined that the detected vertical velocity of the UAV is not less than or equal to the descending velocity threshold, then the method proceeds to step S312. In step S312, the at least one rotor is controlled to switch from the first preset rotation acceleration to a second preset rotation acceleration. For example, the first preset rotation acceleration can be set as 600 r/s, and the second preset rotation acceleration can be set as 1800 r/s.

In some embodiments, prior to proceeding to step S312, a preset delay time can be set up. Specifically, once the at least one rotor is initiated to operate with the first preset rotation acceleration, even the step S308 indicates that the UAV's take-off is abnormal, the method only proceeds to step S312 after awaiting the preset delay time has lapsed. In other words, during the preset delay time, the UAV control the at least one rotor to maintain the first preset rotation acceleration. The preset delay time can set depending on actual demands, for example, 1 second.

After this rotation acceleration switch in step S312, it needs to keep detecting the vertical velocity of the UAV to make sure if this switch works.

Thus, in step S314, the vertical velocity of the UAV is updated, and in step S316, it is determined whether the updated vertical velocity of the UAV is less than or equal to the descending velocity threshold.

In step S318, if the determination is YES, which means the switch made in step S312 works and the UAV has overcome the abnormality, then the UAV will switch back to the first preset rotation acceleration, as shown in step S318.

In step S320, it is determined whether the detected current height of the UAV is greater than or equal to the threshold.

In step S322, once the detected current height of the UAV is greater than or equal to the threshold, the UAV will send a hover signal to the at least one rotor, accordingly, the UAV will hover in the current height.

Figure 4:
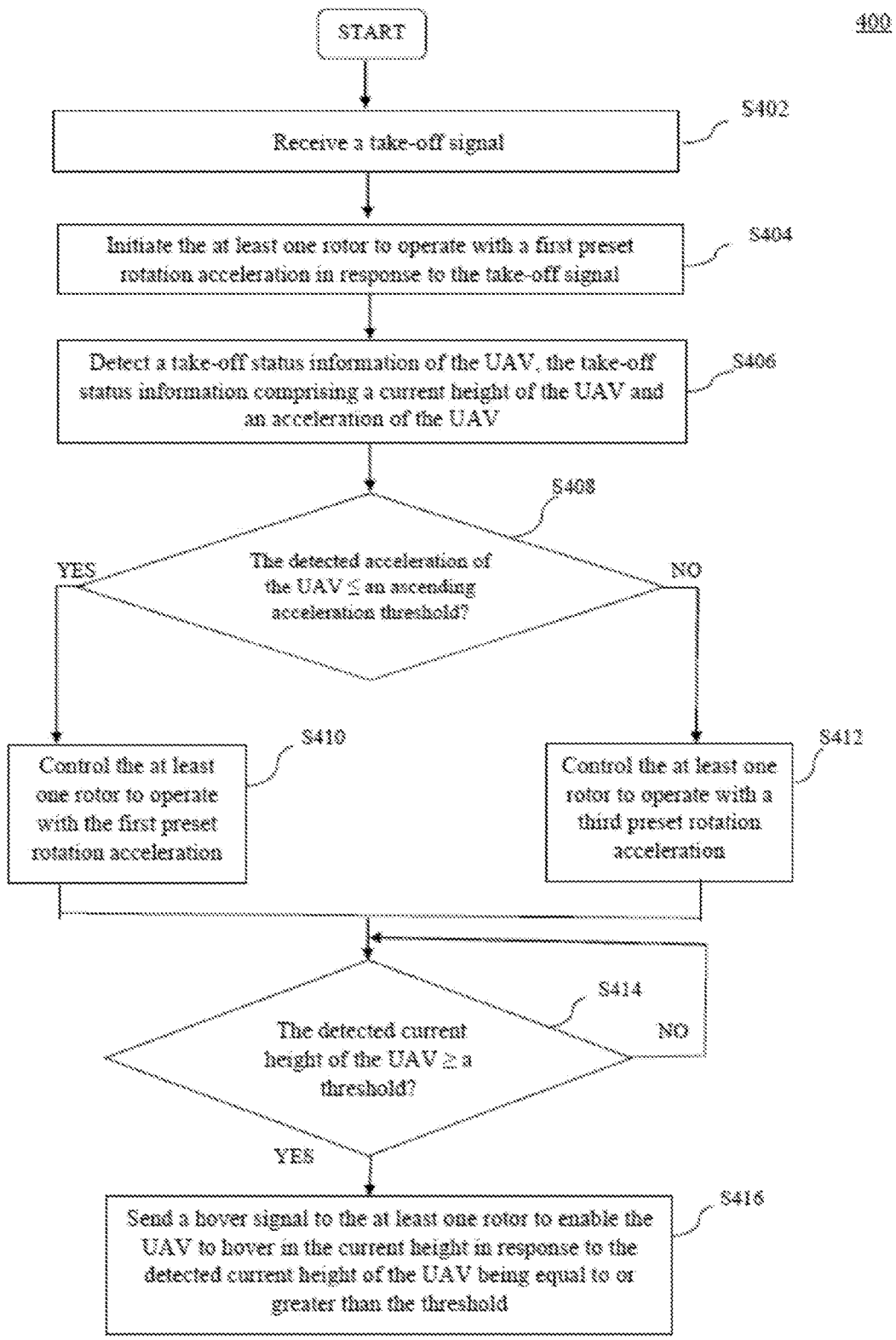
FIG. 4 is a flowchart of still another exemplary method for controlling the UAV, according to embodiments of the disclosure.

FIG. 4 is a flowchart of another exemplary method for controlling the UAV, according to embodiments of the disclosure. Steps S402-404 are substantially same as with the steps S202-204, which will not be elaborated here.

In step S406, in addition to detecting the current height of the UAV, the take-off status information may further include an acceleration of the UAV. The acceleration of the UAV could be a vertical component of the acceleration vector. The acceleration of the UAV can be detected by an acceleration sensor of the UAV.

For example, when the user want to quickly make the UAV hover in certain height, after the UAV operates with the first preset rotation acceleration, the user may apply a upward-lifting force to the UAV to achieve a quick hover. Thus, the acceleration of the UAV is served as an indicator of whether the user applies a lifting force to make a quick hover. Depending on the detected acceleration of the UAV, the rotation speed of the at least one rotor will be adjusted accordingly.

In step S408, before the detected current height of the UAV becomes equal to or greater than the threshold, it is determined whether the detected acceleration of the UAV is less than or equal to an ascending acceleration threshold. The ascending acceleration can be set according to actual conditions, for example, 10 cm/s$^2$. If the determination is YES, the method proceed to step S410, which means the user does not apply a lifting force to the UAV. Thus, the at least one rotor is controlled to maintain the first preset rotation acceleration, as shown in step S420. Next, in step S414, once the detected current height of the UAV is greater than the threshold, the UAV will send a hover signal to the at least one rotor.

Instead, if the determination is NO, the method proceeds to step S412, which means the user applies a lifting force to the UAV. Thus, the at least rotor is controlled to increase up to a greater speed, for example, a third rotation acceleration, as shown in step S412. The third preset rotation acceleration could be same as, or different from the second preset rotation acceleration.

Then, the method proceeds to step S414 to determine whether the detected current height of the UAV is greater than or equal to the threshold. In some embodiments, prior to proceeding to the step S414, additional steps may be executed after the step S412. For example, the acceleration of the UAV is updated and once the updated acceleration of the UAV is determined to be less than or equal to the ascending acceleration threshold, then, the third rotation acceleration is switched back to the first preset rotation acceleration.

In step S414, if the determination of is YES, the UAV will send a hover signal to the at least one rotor to enable the UAV to hover in the current height, as shown in step S416.

In addition to the flowcharts shown in FIG. 2-4, the present disclosure also incorporate certain mechanisms for UAV's safety considerations, as described in details below.

Figure 7:
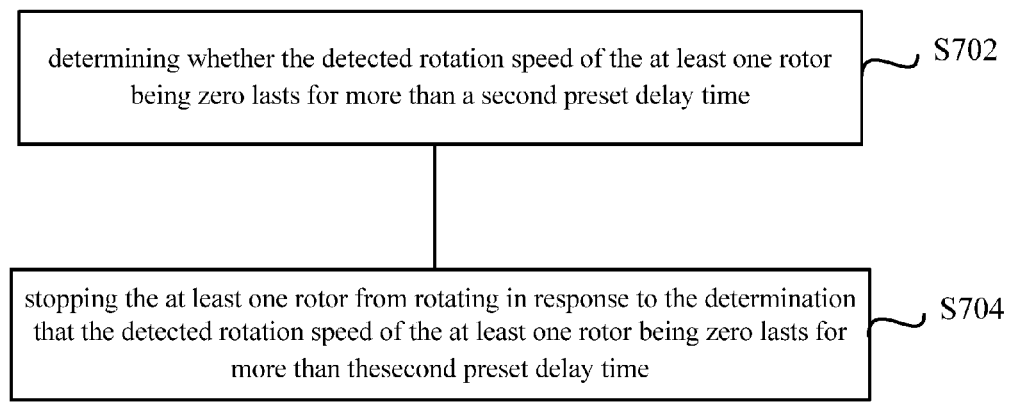
FIG. 7 is a flowchart of another exemplary method for controlling the UAV, according to embodiments of the disclosure.

In some embodiments, the take-off status information may further include a rotation speed of the rotors. Specifically, once the rotors start rotating, a real-time rotation speed of the rotors is detected. When detecting that the rotation speed of the rotors is abnormal, the rotation of the rotors is terminated. For example, before the detected current height of the UAV becomes equal to or greater than the threshold, during the rotation of the rotors, the rotation speed of the rotor will change abruptly (e.g., the detected rotation speed of the at least one rotor being zero lasts for more than a second preset delay time) if bumping to other objects. In response, the at least one rotor is stopped from rotating in response to the determination that the detected rotation speed of the at least one rotor being zero lasts for more than the second preset delay time. Termination of the rotation of the rotors will avoid occurrence of personnel injury or damage to other objects or the rotors. Therefore, the safety of the environment and the UAV are ensured. Accordingly, in some embodiments, the detected take-off status information further includes a rotation speed of the at least one rotor, and the method for controlling the UAV of the present disclosure may further include steps S702 and S704 as shown in FIG. 7. In step S702, it is determined whether the detected rotation speed of the at least one rotor being zero lasts for more than a second preset delay time, before the detected current height of the UAV becomes equal to or greater than the threshold. In step S704, the at least one rotor is stop from rotating in response to the determination that the detected rotation speed of the at least one rotor being zero lasts for more than the second preset delay time.

Figure 8:
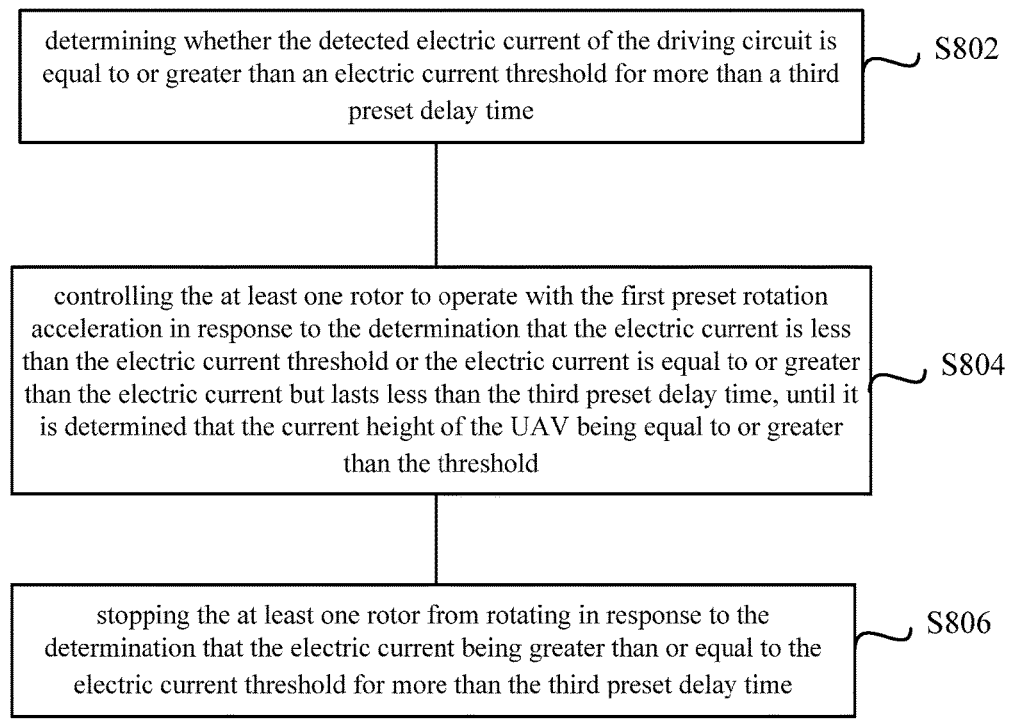
FIG. 8 is a flowchart of still another exemplary method for controlling the UAV, according to embodiments of the disclosure.

In alternative embodiments, the take-off status information may further include an electric current of a driving circuit of the UAV. That is, the abnormality of the rotors may be detected by measuring electric current changes of the drive circuit of the UAV. For example, before the detected current height of the UAV becomes equal to or greater than the threshold, when the rotors collide with other objects, the rotation speed of the rotors is forced to decrease, which will further cause the electric current of to rise. Accordingly, as a safety measure, if the electric current of the drive motor is detected to rise abruptly, for example, being equal to or greater than an electric current threshold for more than a third preset delay time, the rotors stop rotating. If not, the at least one rotor is controlled to operate with a first preset rotation acceleration, until the current height of the UAV being equal to or greater than the threshold. Accordingly, in some embodiments, the detected take-off status information further includes an electric current of a driving circuit of the UAV, and the method for controlling the UAV of the present disclosure may further include steps S802-S806 as shown in FIG. 8. In step S802, it is determined whether the detected electric current of the driving circuit is equal to or greater than an electric current threshold for more than a third preset delay time, before the detected current height of the UAV becomes equal to or greater than the threshold. In step S804, the at least one rotor is controlled to operate with the first preset rotation acceleration in response to the determination that the electric current is less than the electric current threshold or the electric current is equal to or greater than the electric current but lasts less than the third preset delay time, until it is determined that the current height of the UAV being equal to or greater than the threshold. In step S806, the at least one rotor is stopped from rotating in response to the determination that the electric current being greater than or equal to the electric current threshold for more than the third preset delay time.

Figure 5:
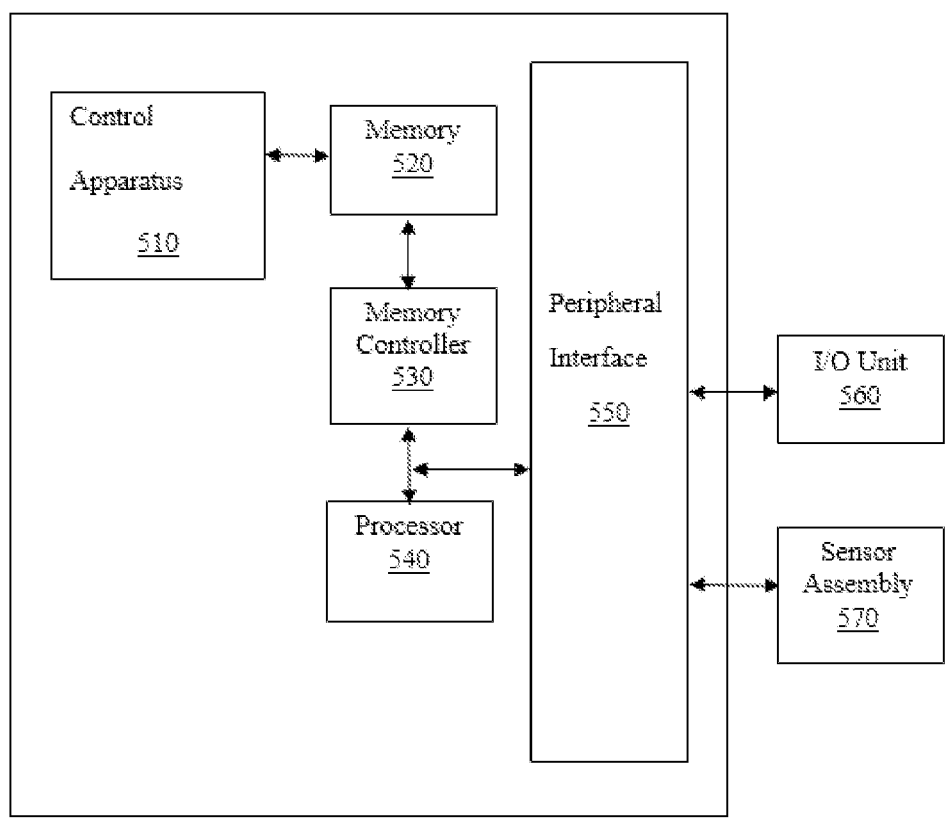
FIG. 5 is a block diagram of the UAV in the take-off system environment of FIGS. 1A-1B.

FIG. 5 is a block diagram schematically illustrating the UAV 110 of FIGS. 1A-1B, according to embodiments of the disclosure. As depicted in FIG. 5, the UAV 110 includes a control apparatus 510, a memory 520, a memory controller 530, a processor 540, peripheral interface 550, an input and output (I/O) unit 560 and a sensor assembly 570. The memory 520, the memory controller 530, the processor 540 and the peripheral interface 250, the I/O unit 560 and the sensor assembly 570 are directly or indirectly connected to each other to achieve data transmission or exchange. For example, these elements may be electrically connected to each other via one or more communication buses or signal lines. The control apparatus 510 can include at least one software function module in a form of software or firmware stored in the memory 520. The processor 540 is used for performing executable modules stored in the memory 520, such as software modules or computer programs included in the control apparatus 510.

The memory 520 may be, but not limited to, random access memory (RAM), read only memory (ROM), programmable read-only memory (PROM), erasable read only memory (EPROM), electrically erasable read only memory (EEPROM) and the like. The memory 520 is used for storing program, and the processor 540 executes the program after receiving the execution instruction. The method executable by a server or a computer defined in any embodiment of the present disclosure can be applied in the processor 540, or implemented by the processor 540.

The processor 540 may be an integrated circuit chip with the signal processing capability. The processor 540 as described may be a general purpose processor, including a central processor (CPU), a network processor (NP). The processor 540 can also be a digital signal processor (DSP), application specific integrated circuit (ASIC), Field-programmable gate array (FPGA) or other programmable logic device, discrete gate or transistor logic, discrete hardware components. The processor 540 can execute or implement methods, steps and logic diagrams disclosed in embodiments of the present disclosure. The processor 540 may be a microprocessor or any conventional processor, etc.

The peripheral interface 550 gets various I/O devices coupled to the processor 540 and the memory 520. In some embodiments, the peripherals interface 550, the processor 540 and the memory controller 530 may be implemented in a single chip. In other embodiments, they may be implemented by separate chips.

The I/O unit 560 is used for users to input data to achieve interactions with the UAV 110. The I/O unit 560 may be, but not limited to, buttons to output a corresponding signal in response to users' operation.

The sensor assembly 570 is used to output a corresponding signal in response to a user operation. In some embodiments, the sensor assembly 570 may be, but not limited to, a voice control sensor and an acceleration sensor, a gyro sensor, a barometer and the like.

Figure 6:
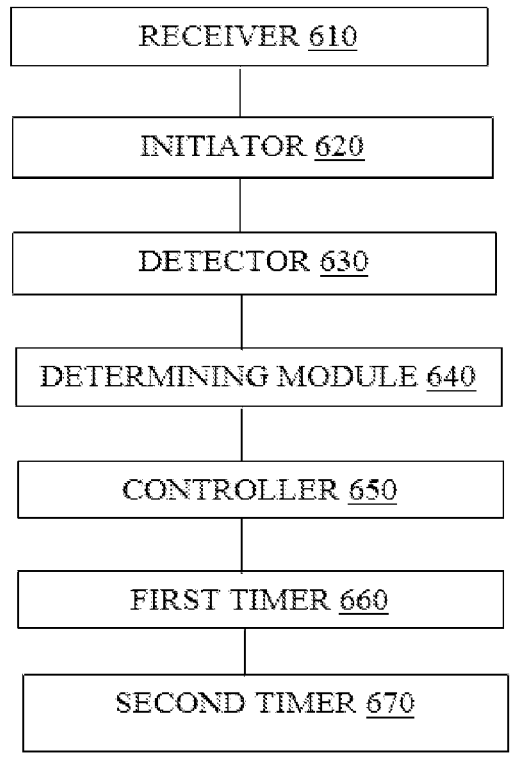
FIG. 6 is a block diagram of an exemplary control apparatus in the UAV of FIG. 5.

FIG. 6 provides a schematic view of the structure of the control apparatus 510 shown in FIG. 5. As depicted in FIG. 6, the control apparatus 510 includes a receiver 610 configured to receive a take-off signal. The take-off signal is triggered by inputting an instruction from a user when the UAV 110 is placed to a take-off platform. For example, the receiver 510 detects if the take-off signal is input through pressing a button, a voice control or tapping the UAV 110.

The control apparatus 510 may further include an initiator 620, which is configured to initiate at least one rotor of the rotor assembly to operate with a first preset rotation acceleration in response to the take-off signal.

A detector 630 is configured to detect a take-off status information of the UAV, the take-off status information comprises a current height of the UAV.

A determining module 640 is configured to determine whether the detected current height of the UAV is equal to or greater than the threshold. If it is determined that the detected current height of the UAV is greater than or equal to the threshold, a controller 650 is configured to send a hover signal to the at least one rotor to enable the UAV to hover in the current height.

In some embodiments, the take-off status information may further comprises a current velocity of the UAV, an ascending acceleration of the UAV, and a current rotation speed of the at least one rotor. Through these information, the UAV's take-off status may be further optimized. For example, the detector 630 is configured to detect a vertical velocity of the UAV, and, accordingly, an additional determining module is configured to determine whether the vertical velocity of the UAV reaches a descending velocity threshold. Based on the determination, the controller 650 is configured to adjust the at least one rotor. If the determination is YES, the controller 650 is configured to control the at least one rotor to operate with a second preset rotation acceleration, wherein the second preset rotation acceleration is greater than the first preset rotation acceleration.

In some embodiments, the control apparatus 510 may further comprise a first timer 660. The first timer 660 is configured to, prior to controlling the at least one rotor to operate with a second preset rotation acceleration, start counting a first preset delay time after initiating the at least one rotor to operate with a first preset rotation acceleration.

Further, since the rotors of the UAV 110 may collide with other objects during flight, other modules may be incorporated to prevent further personal injury or damages. For example, the take-off status information may include a rotation speed of the rotor.

In the presence of abnormality of the rotor, a protection mechanism needs to set up, for example, the controller 650 is configured to terminate the rotation of the rotor when the detector 630 detects an abnormality, for example, the detected rotation speed of the at least one rotor being zero lasts for more than the second preset delay time. Accordingly, a second timer 670 may be set up. The second timer 670 is configured to start counting a second preset delay time since a detected rotation speed of the at least one rotor becomes zero.

The apparatus and methods disclosed in the embodiments of the present disclosure can be implemented by other ways. The aforementioned apparatus embodiments are merely illustrative. For example, flowcharts and block diagrams in the figures show the architecture and the function operation according to a plurality of apparatus, methods and computer program products disclosed in embodiments of the present disclosure. In this regard, each frame of the flowcharts or the block diagrams may represent a module, a program segment, or portion of the program code. The module, the program segment, or the portion of the program code include one or more executable instructions for implementing predetermined logical function. It should also be noted that in some alternative embodiments, the function described in the block can also occur in a different order as described from the figures. For example, two consecutive blocks may actually be executed substantially concurrently. Sometimes they may also be performed in reverse order, depending on the functionality. It should also be noted that, each block of the block diagrams and/or flowchart block and block combinations of the block diagrams and/or flowchart can be implemented by a dedicated hardware-based systems execute the predetermined function or operation or by a combination of a dedicated hardware and computer instructions.

Further, the functional modules disclosed in embodiments of the present disclosure may be integrated together to form a separate part. Alternatively, each module can be alone, or two or more modules can be integrated to form a separate section.

If the functions are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include: U disk, removable hard disk, read only memory (ROM), a random access memory (RAM), floppy disk or CD-ROM, which can store a variety of program codes. It should be noted that relational terms, such as first and second, are used solely to a separate operating entity from another entity, and do not necessarily require or imply that the actual such relationship or order exist between these entities or operations. Moreover, the term "comprising", "including" or any other variation thereof are intended to cover a non-exclusive inclusion, such that processes, methods, articles, or apparatus including a series of factors includes not only those elements, but also includes other elements not explicitly listed, or further includes inherent factors for such processes, methods, articles or devices. Without more constraints, elements defined by the statement "includes a . . . " does not exclude the presence of other elements included in the processes, methods, articles or devices.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A method for controlling an unmanned aerial vehicle (UAV), the UAV comprising at least one rotor, the method comprising the steps of:
   receiving a take-off signal;
   initiating the at least one rotor to operate with a first preset rotation acceleration in response to the take-off signal;

detecting a take-off status information of the UAV, the take-off status information at least comprising a vertical velocity of the UAV and a current height of the UAV;
determining whether the detected vertical velocity of the UAV reaches a descending velocity threshold;
adjusting the at least one rotor in response to the determination of the detected vertical velocity of the UAV;
determining whether the detected current height of the UAV is equal to or greater than a threshold; and
sending a hover signal to the at least one rotor to enable the UAV to hover in the current height in response to the determination that the detected current height of the UAV is equal to or greater than the threshold;
wherein the step of adjusting comprises: in response to the determination that the vertical velocity of the UAV is less than or equal to the descending velocity threshold, controlling the at least one rotor to operate with the first preset rotation acceleration, until it is determined that the current height of the UAV being equal to or greater than the threshold.

2. The method of claim 1, wherein the take-off signal is triggered by inputting an instruction from a user.

3. The method of claim 2, wherein prior to the step of inputting further comprises: placing, by a user, the UAV in a take-off platform, wherein the take-off platform is for a take-off preparation of the UAV.

4. The method of claim 1, wherein the current height of the UAV is a relative height from the UAV to a take-off platform and the threshold is a minimum height unit that is detectable by a sensor of the UAV.

5. The method of claim 1, wherein the step of adjusting comprises: in response to the determination that the vertical velocity of the UAV is greater than the descending velocity threshold, controlling the at least one rotor to operate with a second preset rotation acceleration, wherein the second preset rotation acceleration is greater than the first preset rotation acceleration.

6. The method of claim 5, wherein controlling the at least one rotor to operate with the second preset rotation acceleration comprises:
updating the vertical velocity of the UAV;
determining whether the updated vertical velocity of the UAV is less than or equal to the descending velocity threshold; and
switching the at least one rotor to operate from the second preset rotation acceleration to the first preset rotation acceleration in response to the determination that the updated vertical velocity of the UAV being less than or equal to the descending velocity threshold.

7. The method of claim 5, wherein prior to the step of controlling the at least one rotor to operate with the second preset rotation acceleration, further comprises:
awaiting a first preset delay time after initiating the at least one rotor to operate with the first preset rotation acceleration.

8. The method of claim 1, wherein the detected take-off status information further comprises an acceleration of the UAV; and the method further comprises the steps of:
before the detected current height of the UAV becomes equal to or greater than the threshold, determining whether the detected acceleration of the UAV reaches an ascending acceleration threshold;
adjusting the at least one rotor in response to the determination.

9. The method of claim 8, wherein the step of adjusting further comprises:

controlling the at least one rotor to operate with the first preset rotation acceleration in response to the determination that the acceleration of the UAV is less than or equal to the ascending acceleration threshold, until it is determined that the current height of the UAV being equal to or greater than the threshold.

10. The method of claim 8, wherein the step of adjusting further comprising:
controlling the at least one rotor to operate with a third preset rotation acceleration in response to the determination that the acceleration of the UAV is greater than the ascending acceleration threshold, until it is determined that the current height of the UAV being equal to or greater than the threshold;
the third preset rotation acceleration is greater than the first preset rotation acceleration.

11. The method of claim 1, wherein the detected take-off status information further comprises a rotation speed of the at least one rotor; and the method further comprises the steps of:
before the detected current height of the UAV becomes equal to or greater than the threshold, determining whether the detected rotation speed of the at least one rotor being zero lasts for more than a second preset delay time;
stopping the at least one rotor from rotating in response to the determination that the detected rotation speed of the at least one rotor being zero lasts for more than the second preset delay time.

12. The method of claim 1, wherein the detected take-off status information further comprises an electric current of a driving circuit of the UAV, and the method further comprises:
before the detected current height of the UAV becomes equal to or greater than the threshold, determining whether the detected electric current of the driving circuit is equal to or greater than an electric current threshold for more than a third preset delay time; and
controlling the at least one rotor to operate with the first preset rotation acceleration in response to the determination that the electric current is less than the electric current threshold or the electric current is equal to or greater than the electric current but lasts less than the third preset delay time, until it is determined that the current height of the UAV being equal to or greater than the threshold; and
stopping the at least one rotor from rotating in response to the determination that the electric current being greater than or equal to the electric current threshold for more than the third preset delay time.

13. An apparatus for controlling an unmanned vehicle (UAV), the UAV comprises at least one rotor, the apparatus comprising:
a receiver configured to receive a take-off signal;
an initiator configured to initiate at least one rotor of the rotor assembly to operate with a first preset rotation acceleration in response to the take-off signal;
a detector configured to detect a take-off status information of the UAV, the take-off status information at least comprising a vertical velocity of the UAV and a current height of the UAV;
a determining module configured to determine whether the detected vertical velocity of the UAV reaches a descending velocity threshold, and determine whether the detected current height of the UAV is equal to or greater than the threshold; and a controller configured to adjust the at least one rotor in response to the determination of the detected vertical velocity of the UAV and send a hover signal to the at least one rotor to enable the UAV to hover in the current height in response to the detected current height of the UAV being greater than or equal to a threshold;

wherein the controller is further configured to control, in response to the determination that the vertical velocity of the UAV is less than or equal to the descending velocity threshold, the at least one rotor to operate with the first preset rotation acceleration, until it is determined that the current height of the UAV being equal to or greater than the threshold.

14. A UAV take-off system, comprising:

a UAV comprising at least one rotor;

a take-off platform configured to permit the UAV to take off; and wherein the UAV is configured to initiate the at least one rotor to operate with a first preset rotation acceleration, detect a vertical velocity of the UAV and a current height and adjust a rotation speed of the at least one rotor in response to a determination of whether the detected vertical velocity of the UAV reaches a descending velocity threshold, such that the UAV is enabled to hover in the current height upon the detected current height of the UAV being greater than or equal to a threshold, and wherein the UAV is further configured to control, in response to the determination that the vertical velocity of the UAV is less than or equal to the descending velocity threshold, the at least one rotor to operate with the first preset rotation acceleration, until it is determined that the current height of the UAV being equal to or greater than the threshold.

* * * * *